United States Patent [19]
Audi et al.

[11] Patent Number: 4,777,768
[45] Date of Patent: Oct. 18, 1988

[54] HOLDING OF GLASS SHEETS BY ELECTROMAGNET

[75] Inventors: Josef Audi; Heinz-Josef Reinmold, both of Aachen, Fed. Rep. of Germany

[73] Assignee: Saint-Gobain Vitrage, Courbevoie, France

[21] Appl. No.: 946,644

[22] Filed: Dec. 29, 1986

Related U.S. Application Data

[63] Continuation of Ser. No. 843,849, Mar. 27, 1986, abandoned, which is a continuation of Ser. No. 669,871, Nov. 9, 1984, abandoned.

[30] Foreign Application Priority Data

Nov. 9, 1983 [FR] France .................. 83 17831

[51] Int. Cl.⁴ .............................. B24B 7/00
[52] U.S. Cl. .................. 51/35; 51/216 LP; 51/217 R
[58] Field of Search ........ 51/35, 283 E, 98 R, 51/216 LP, 217 R, 34 A; 269/8

[56] References Cited

U.S. PATENT DOCUMENTS

| | | |
|---|---|---|
| 1,961,219 | 6/1934 | Fenton . |
| 2,713,379 | 7/1955 | Sisson . |
| 3,626,342 | 12/1971 | Green ............................. 335/275 |
| 3,660,949 | 5/1972 | Coes, Jr. ......................... 51/216 R |
| 3,785,229 | 1/1974 | Halberschmidt et al. ............. 83/6 |
| 3,797,339 | 3/1974 | Pape et al. ...................... 83/12 |
| 4,145,723 | 3/1979 | Mucha et al. .................... 83/879 |
| 4,171,657 | 10/1979 | Halberschmidt et al. ........... 83/886 |
| 4,325,188 | 4/1982 | Reinmold et al. ................. 33/1 M |
| 4,519,167 | 5/1985 | Halberschmidt et al. ........ 51/165.77 |
| 4,528,780 | 7/1985 | Halberschmidt et al. ........ 51/283 E |
| 4,556,834 | 12/1985 | Reinmold et al. ................. 318/569 |
| 4,633,408 | 12/1986 | Reinmold et al. .............. 51/283 E |

FOREIGN PATENT DOCUMENTS

| | | |
|---|---|---|
| 2832753 | 2/1979 | Fed. Rep. of Germany . |
| 83400129.9 | 1/1983 | Fed. Rep. of Germany . |
| 1424448 | 12/1965 | France . |
| 1434619 | 2/1966 | France . |

Primary Examiner—Frederick R. Schmidt
Assistant Examiner—Maurina Rachuba
Attorney, Agent, or Firm—Oblon, Fisher, Spivak, McClelland & Maier

[57] ABSTRACT

The invention relates to machining of glass sheets and in particular to holding of said glass sheets during grinding of their edges. The glass sheets are locked on their work plate with an electromagnet. This locking provides an effective holding while freeing space above the glass sheets.

5 Claims, 1 Drawing Sheet

HOLDING OF GLASS SHEETS BY ELECTROMAGNET

This application is a continuation of application Ser. No. 843,849, filed Mar. 27, 1986, now abandoned, which is a continuation of application Ser. No. 669,871, filed Nov. 9, 1984, now abandoned.

BACKGROUND OF THE INVENTION

1. Field of the Invention

The present invention relates to a machine for machining glass sheets, and more particularly a machine for grinding the edges and/or marginal areas of a glass sheet, provided with a holding device locking the glass sheet in its machining position.

2. Description of the Prior Art

Holding devices already known on machines for grinding the edges of glass sheets have a support plate on which glass sheets are clamped either with a piston that is movable in the direction of the support plate or with a suction device in the support plate.

When locking of the glass sheet is done with a movable piston, this has the drawback that the piston and frame necessary for its retention must be placed above the support plate. Therefore, these holding devices cannot be used when the free space above the support plate must remain available for other elements of the machine, as for example, in the case of grinding machines with a carriage having two degrees of freedom. In such cases, the support plate instead is equipped with low pressure suction disks, or else the plate itself constitutes a low pressure suction plate, locking to the glass sheet being worked on due to the suction effect of the low pressure applied.

In these low pressure suction holding devices, the force with which the glass sheet is held depends on the size of the suction disks or the suction plate and it is sometimes limited by the small size of the glass sheets. If the glass sheets are small, for example the triangular side panes for automobiles, the force that can be obtained by the low pressure suction does not suffice for reliable locking, and during the grinding operations there is the danger of movement of the glass sheet in relation to the support plate.

SUMMARY OF THE INVENTION

An object of the present invention is the provision of a machine for grinding glass sheets with a holding device with which a reliable locking of the glass sheets is attained, even in the case of relatively small sheets, without the space above the glass sheet being occupied by the holding device and thereby excluding other elements of the machine or other machines.

According to the invention this object is achieved by using as a holding device the iron core of an electromagnet and a ferromagnetic counterpiece drawn by this core. The glass sheet is locked by the electromagnetic force between the iron core and ferromagnetic piece.

Thanks to the holding device according to the invention, it is possible, particularly in the case of small glass sheets, to obtain much higher locking forces than with low pressure suction disks or plates.

The ferromagnetic counterpiece applied on the glass sheet, opposite the iron core, exhibits a relatively low height so that it is not a substantial hinderence to the movement of the movable grinding machine elements above the glass sheet.

Of course, the use of this holding device, proposed here by way of example for machines for grinding glass sheets, is also applicable for other machines, as well as various machines for machining glass sheets or other materials and generally for any machine for working the edges or surface of plates.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
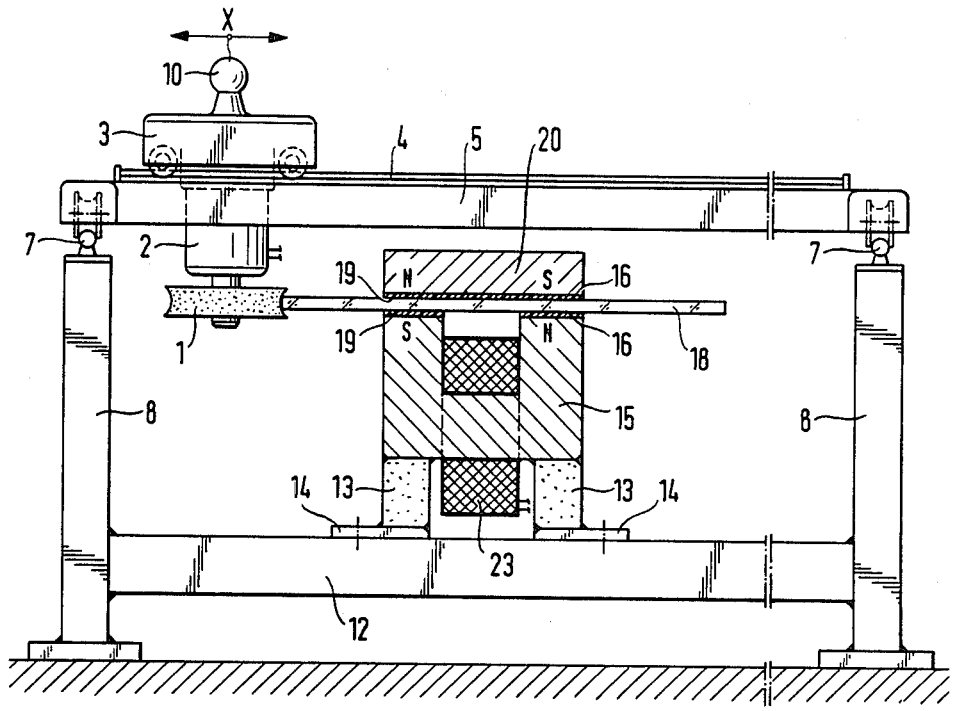
FIG. 1 is a schematic front view of a machine for grinding the edges of glass sheets, having a carriage with two degrees of freedom to carry the grinding tool and equipped with the holding device according to the invention.
Figure 2:
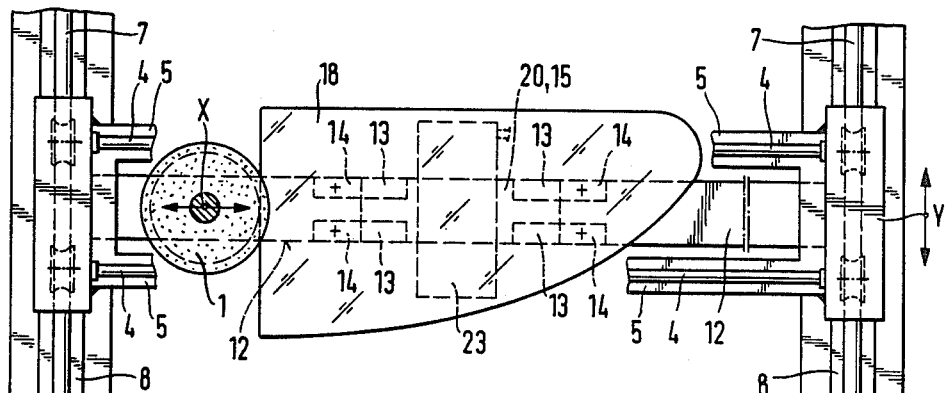
FIG. 2 is a top view of the machine of FIG. 1.

In the illustrated embodiment, the working tool, i.e., a grinding wheel 1, of the machine is rotatably driven by a motor 2 carried by a carriage 3 which is movable in two directions. This carriage 3 moves in direction X, shown by a double arrow, by traveling on rails 4 placed over the length of a bridge 5. This bridge 5 in turn can move in direction Y perpendicular to direction X, shown by a double arrow in FIG. 2, by traveling on two rails 7 fastened to supports 8 forming the main frame of the machine. The directions X and Y define a plane parallel to the glass sheet 18.

Thus, carriage 3 with grinding tool 1 has two degrees of freedom, one along direction X by traveling on rails 4, the other along direction Y by causing bridge 5 to travel on rails 7; in this way it is possible to describe any path in the area covered by rails 4 and 7.

Carriage 10 can be moved along the desired path, for example manually with a handle 10, or automatically by equipping the machine with an automatic path control of the type described in European patent publication No. 0 084 504 and in German patent application No. P 3 301 170.

A crosspiece 12 connects supports 8 which are stationary. On this crosspiece 12, fixed to the machine frame, are placed soles 14. Blocks 13 of nonferromagnetic material, which support the U-shaped soft iron core of an electromagnet are placed on the soles 14.

The upper end surfaces 16 of the two legs of U-shaped iron core 15, which constitute the pole pieces of the electromagnet, are located in the same horizontal plane and act as a plane of contact with glass sheets 18 to be ground. These surfaces 16 are each provided with an elastic and/or soft cover 19 which avoids any damage to the glass surface by contact with iron core 15. Instead of a cover 19 completely adhering to the entirely of the surface of the iron core 15, it is of course also possible to provide movable pads, which each time are placed between surfaces 16 of iron core 15 and glass sheet 18. The covers or pads 19 can, for example, be made of rubber or a fabric.

Above glass sheet 18, after insertion of a cover 19 of soft material, a ferromagnetic piece 20, for example of iron is smaller than the sheet 18 and is placed in such a position that it covers iron core 15 while leaving the edges of the sheet exposed. Placing of piece 20 can be performed manually or with an automatic mechanical device. Magnetic piece 20 constitutes the mobile armature of the electromagnet when the magnetic circuit is closed in iron core 15.

An example of an electromagnet, sufficient for usual cases, has a U-shaped iron core 15, whose two surfaces of application 16 against the glass sheets each have a dimension of 50 cm$^2$. When a locking force of about 500 kgf is to be exerted on the glass sheet by iron picce 20, it is necessary to have, for this purpose, a winding 23 with a number of ampere-turns equal to 14,000, which can be obtained without any technical difficulty. A suitable iron core has, in its outside dimensions, a height of 18 cm, a width of 24 cm and a depth of 7 cm, while iron piece 20 can have a height of 3.5 cm for a length of 24 cm and a depth of 7 cm.

Magnetic holding devices of this type are particularly suitable for locking relatively small glass sheets in a machining device; "small glass sheets" is understood to mean sheets whose surface is less than about 1000 cm$^2$.

The invention has been described in the case of a machine for grinding edges with a carriage having two degrees freedom. However, it is understood that it is also suitable, in the same way, for other machines for grinding edges, particularly machines in which the glass sheet rests on a rotating plate and in which the grinding tool can move along an axis placed radially in relation to the axis of rotation of this support plate. Further, the holding device according to the invention is applicable not only to machines for grinding edges but also to machines for working edges, marginal areas or the surface of plates of glass or other material.

Obviously, numerous modifications and variations of the present invention are possible in light of the above teachings. It is therefore to be understood that within the scope of the appended claims, the invention may be practiced otherwise than as specifically described herein.

What is claimed is new and desired to be secured by Letters Patent of the United States is:

1. An apparatus for machining edges of a sheet of non-magnetic material, comprising:
    means for holding said sheet, said means for holding comprising an iron core including a portion for contacting said sheet, a ferromagnetic piece, both said core and said ferromagnetic piece having a size smaller than said sheet, and coil means for inducing an electromagnetic force in said iron core, wherein said iron core has a shape of a U, wherein said coil means comprise electrical windings on a base of said U, wherein said contacting portion of said core comprises upper end surfaces of legs of said U upon which said sheet rests, and wherein a lower surface of said ferromagnetic piece may by positioned on an upper surface of said sheet directly above said upper surfaces of said legs, whereby said sheet is locked against transverse movement relative to said means for holding between said upper end surfaces and said lower surface of said ferromagnetic piece due to said force and to the weight of said ferromagnetic piece with all of the edges of said sheet simultaneously exposed;
    means for machining edges of said sheets;
    means for providing relative movement in two transverse directions between said sheet and said means for machining, said transverse directions defining a plane extending parallel to said sheet, and
    protective elastic cover means positioned between at least a portion of said upper leg surfaces and said sheet, and positioned between at least a portion of said lower ferromagnetic piece surface and said sheet.

2. The apparatus of claim 1 wherein each said upper leg surface has an area of about 50 cm$^2$ and wherein said winding has about 14,000 ampere turns, resulting in a locking force of about 500 kgf.

3. The apparatus of claim 1 including a frame, wherein said iron core is mounted on said frame via non-magnetic blocks and wherein said means for machining is movable mounted on said frame.

4. The apparatus of claim 1 wherein each said upper leg surface has an area of about 50 cm$^2$ and wherein said winding has about 14,000 ampere turns, resulting in a locking force of about 500 kgf.

5. The apparatus of claim 1 including a frame, wherein said iron core is mounted on said frame via non-magnetic blocks and wherein said means for machining is movably mounted on said frame.

* * * * *